United States Patent
Engel et al.

(10) Patent No.: US 10,706,161 B2
(45) Date of Patent: Jul. 7, 2020

(54) SECURED MEDIA FILE PRESENTATION (71) Applicants: Ran Engel, New York, NY (US); Roy S. Melzer, Tel-Aviv (IL)

(72) Inventors: Ran Engel, New York, NY (US); Roy S. Melzer, Tel-Aviv (IL)

(*) Notice: Subject to any disclaimer, the term of this patent is extended or adjusted under 35 U.S.C. 154(b) by 251 days.

(21) Appl. No.: 15/856,097

(22) Filed: Dec. 28, 2017

(65) Prior Publication Data

US 2018/0181766 A1  Jun. 28, 2018

Related U.S. Application Data

(60) Provisional application No. 62/439,500, filed on Dec. 28, 2016.

(51) Int. Cl.
| | |
|---|---|
| G06F 21/60 | (2013.01) |
| G06T 5/00 | (2006.01) |
| G06F 3/01 | (2006.01) |
| G06F 3/0488 | (2013.01) |
| G06F 3/03 | (2006.01) |
| G06F 3/0484 | (2013.01) |
| G06F 21/62 | (2013.01) |
| G06F 21/32 | (2013.01) |
| G06K 9/00 | (2006.01) |

(52) U.S. Cl.
CPC .......... *G06F 21/602* (2013.01); *G06F 3/012* (2013.01); *G06F 3/013* (2013.01); *G06F 3/017* (2013.01); *G06F 3/0304* (2013.01); *G06F 3/04842* (2013.01); *G06F 3/04883* (2013.01); *G06F 21/32* (2013.01); *G06F 21/6209* (2013.01); *G06T 5/003* (2013.01); *G06F 2203/04805* (2013.01); *G06K 9/00228* (2013.01); *G06K 9/00355* (2013.01); *G06K 9/00597* (2013.01); *G06T 2207/20092* (2013.01)

(58) Field of Classification Search
CPC .... G06F 21/602; G06F 3/04883; G06F 3/013; G06F 2203/04805; G06F 21/6209; G06F 21/32; G06F 3/017; G06F 3/04842; G06F 3/0304; G06F 3/012; G06T 5/003; G06T 2207/20092; G06K 9/00228; G06K 9/00597; G06K 9/00355
USPC ............................................................ 380/52
See application file for complete search history.

(56) References Cited

U.S. PATENT DOCUMENTS

| | | | |
|---|---|---|---|
| 9,807,732 B1* | 10/2017 | Clark | H04W 24/08 |
| 2011/0163969 A1* | 7/2011 | Anzures | G06F 3/04883 345/173 |
| 2015/0007351 A1* | 1/2015 | Janajri | H04L 63/04 726/30 |

* cited by examiner

Primary Examiner — Kambiz Zand
Assistant Examiner — Aubrey H Wyszynski (57) ABSTRACT

A method of encrypting a target media file that comprises using a processor of a client device associated with a sender for executing a code for: designating a target media file, and receiving from the sender a user selection indicative of an addressee automatically extracting at least one biometric feature of the addressee from at least one image associated with the addressee, using the at least one biometric feature to encrypt the target media file for creating an encrypted target media file, and forwarding an additional client device associated with addressee a message with access information to the encrypted target media file.

17 Claims, 7 Drawing Sheets

SECURED MEDIA FILE PRESENTATION

RELATED APPLICATIONS

This application claims the benefit of priority under 35 USC § 119(e) of U.S. Provisional Patent Application No. 62/439,500 filed Dec. 28, 2016, the contents of which are incorporated herein by reference in their entirety.

FIELD AND BACKGROUND OF THE INVENTION

The present invention, in some embodiments thereof, relates to securing media such as images and video files (e.g. downloads and/or streamed media) and, more specifically, but not exclusively, to methods and systems of encrypting images and video files.

Text messaging, such as Short Messages Service (SMS) or instant messaging, also known as "texting", refers to the exchange (i.e., transmission and receipt) of brief written or text messages or media files between digital mobile phones and between mobile phones and personal computers over cellular or other wireless networks. Many service providers or carriers also offer multimedia messaging services that allow for exchange of messages containing multimedia content, such as image, video and sound content. The most common application of the service is person-to-person messaging and video chat. To send such a message, a user types the text into a mobile phone or other text-enabled device, attaches or creates the desired multimedia content, enters one or more phone numbers or emails or any other identifiers for the recipients of the message, and sends the message.

One problem with such messaging services is that recipients of such messages may without limitation forward them to third parties. While a use may create a customized message that he/she intends for only the intended recipient to receive, the recipient can forward the message to multiple third parties, who may in turn forward the message onto to other parties, and so on. Even in cases where the message/image self-destructs users can still capture image via other methods, such as screen capture which will enable them to share private data in an unintended way by the sender.

SUMMARY OF THE INVENTION

According to some embodiments of the present invention, there is provided a method of encrypting a target media file. The method comprises using a processor of a client device associated with a sender for executing a code for: designating a target media file, receiving a user selection indicative of an addressee, automatically extracting at least one biometric feature of the addressee from at least one image associated with the addressee, using the at least one biometric feature to encrypt the target media file for creating an encrypted target media file, and forwarding the encrypted target media file or access information for accessing the encrypted target media file to an additional client device associated with the addressee.

Optionally, the at least one biometric feature comprises at least one facial feature of a face of the addressee.

Optionally, the at least one image is stored in a contact record of the addressee, the content record is documented in a contact repository of the sender.

Optionally, the at least one image is extracted from a stored media file selected from a media gallery by a user designating the target media file on the client device.

Optionally, the at least one biometric feature is extracted from at least one image tagged with metadata comprising an identifier of the addressee, the identifier is a member of a group consisting of a name, an email address, and a phone number.

More optionally, the target media file is encrypted to be decrypted by the at least one biometric feature and by at least one additional biometric feature extracted from stored media files depicting the user.

Optionally, the designating comprises capturing the target media file using an image sensor of the client device.

Optionally, the designating and the receiving are performed execution of a chat application on the processor and wherein the message is send as an instant message during a chat session comprising a plurality of textual messages which are exchanged between the sender and the addressee.

According to some embodiments of the present invention, there is provided a system of encrypting a target media file. The system comprises a program store storing a code and a processor coupled to the program store for executing the stored code. The code comprises designating a target media file, receiving a user selection indicative of an addressee, automatically extracting at least one biometric feature of the addressee from at least one image associated with the addressee, using the at least one biometric feature to encrypt the target media file for creating an encrypted target media file, and forwarding the encrypted target media file or access information for accessing the encrypted target media file to an additional client device associated with the addressee.

According to some embodiments of the present invention, there is provided a method of decrypting an image. The method comprises using a processor of a client device for executing a code for receiving, over a network, a message addressed to an addressee and an encrypted media file or access information for accessing the encrypted media file, capturing a video imaging at least one body part of the addressee, automatically extracting at least one biometric feature from the video, using the at least one biometric feature to decrypt the media file, and presenting, on a display of the client device, the decrypted media file to the addressee.

Optionally, the message is sent over an instant messaging platform, and video chat.

Optionally, the presenting is disrupted when an iterative or continuous extraction of the at least one biometric feature from the video fails.

Optionally, the presenting is disrupted when at least one different biometric feature which is not the at least one biometric feature is detected in the video.

Optionally, the client device is a smartphone or a tablet and the video is captured using a frontal image capture device of the smartphone tablet, or PC.

According to some embodiments of the present invention, there is provided a method of partly revealing an image. The method comprises receiving, at an addressee client device, access information for accessing media content designated by a sender using a sender client device, using the access information for presenting a masked version of the media content on a display of the addressee client device, and while the masked version is presented spatiotemporally correlating between unmasking of a plurality of regions of the masked version and spatiotemporal data of a fingertip, an eye gaze, or a pointing device such as a computer mouse performing a motion along a nonlinear line in front of the display. Each one of the plurality of regions is unmasked while other of the plurality of regions remain masked.

Optionally, the media content is an image, or image sequence (i.e. video) and the masked version is a blurred version of the image or sequence.

Optionally, the masked version is stored in a server and accessed using the access information via a network; wherein the presenting and the unmasking are performed locally performed by a player installed in the addressee client device.

More optionally, the masked version is generated locally by the player.

Optionally, the unmasking occurs after a successful authentication of the addressee client device based on an addressee identifier provided by the sender client device.

Optionally, the masked version is an outcome of applying a distortion effect on an unmasked media content designated by the sender using the sender client device. And by the receiver spatiotemporal data.

More optionally, the masked version is uploaded by the sender to a chat session held between the sender and the addressee.

Optionally, a region area of each of at least some of the plurality of regions is determined according to at least one object characteristic calculated by processing the media content.

Optionally, the at least one object characteristic is a member of a group consisting of: a facial area of a person imaged in the image, a presence or an absence of a certain anatomical organ imaged in the image, a presence or an absence of a certain person in the image.

Optionally, the unmasking is performed by applying a de-blurring coefficient received from the addressee client device.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to securing media files such as images and video files and, more specifically, but not exclusively, to methods and systems of encrypting images and video files.

According to some embodiments of the present invention, there are provided methods and systems for encrypting media files with biometric features of an addressee, thereby allowing secured presentation of the media files to the addressee which is optionally designated by the sender. The media files are encrypted in a manner that the presentation thereof depends on the presents of the addressee. The presence of the addressee is optionally verified by using her biometric features for decryption, for instance capturing and using facial features of the addressee. The methods and systems allow generating ad hoc encryption without requiring from the addressee to acquire a password or credentials and without requiring from the sender to specify password or credentials. This process simplifies encrypted communication.

According to some embodiments of the present invention, there are provided methods and systems for decrypting media files encrypted with biometric features of an addressee, for instance encrypted as outlined above and described below.

According to some embodiments of the present invention, there are provided methods and systems for preventing replication of media content, such as an image or a video frame, as a whole by presenting different regions of media content in sequential and optionally non repeatable fashion. The methods and systems correlate the presentation of different regions of media content such as an image or frame(s) with the location of a fingertip and/or a gaze direction. For example, the location of a fingertip on a screen may determine which region of a distorted or masked image will be undistorted or unmasked (undistorted or unmasked may be referred to herein interchangeably) when other regions remain distorted or masked (distorted or masked may be referred to herein interchangeably).

The receiver of the content can maneuver her fingertip and/or change the gazing direction for revealing a masked region of the media content in exchange to unrevealing a previous unmasked region. The maneuver may be continuous, for example a finger swipe along a touch screen. The methods and systems allows a user, for example a sender of an image or video with private content, such as child images, sexting content or private nudity content, to send content while being sure that the intended or not intended receiver cannot easily capture an image of a screen presenting the image or video with the private content.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
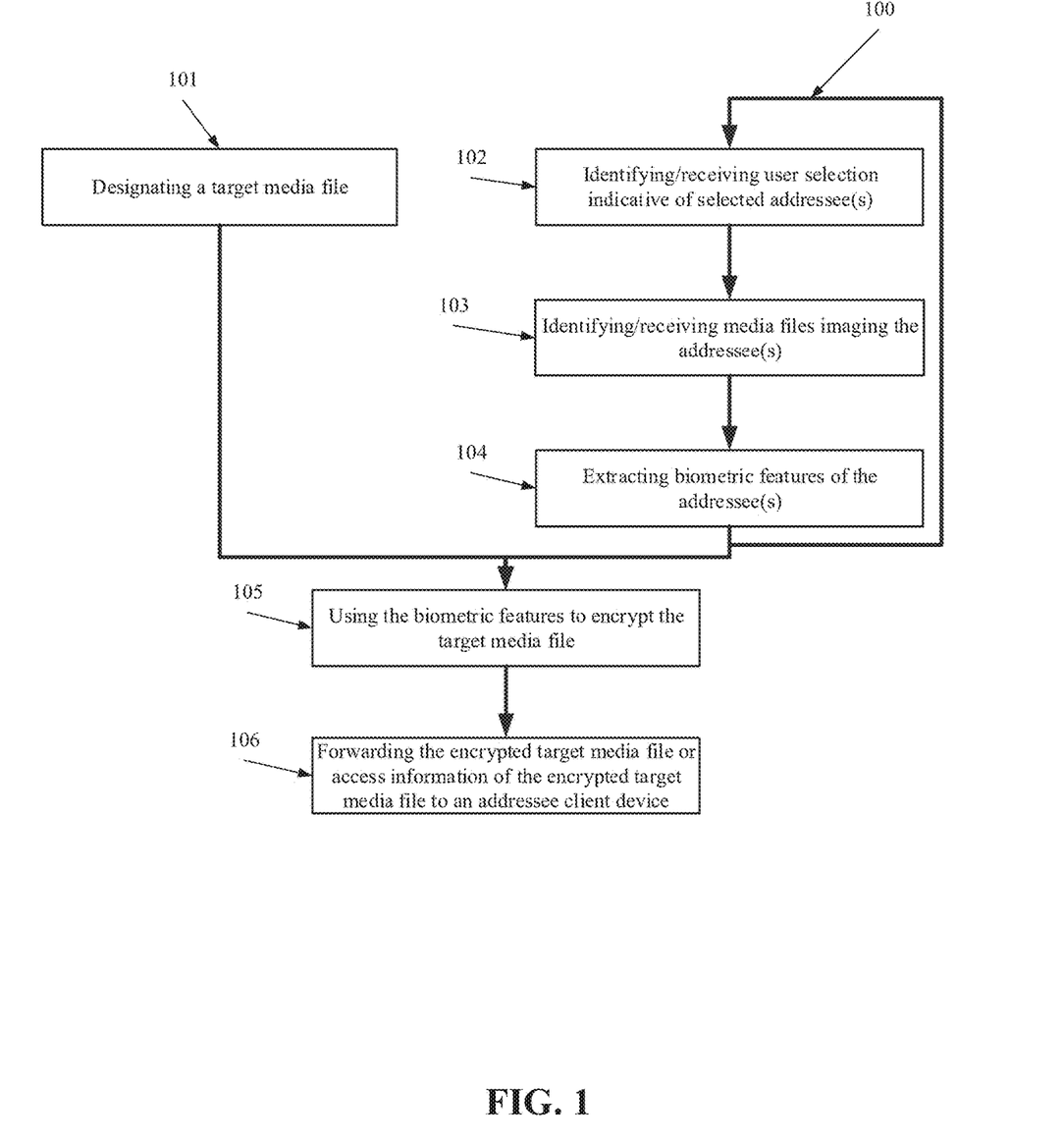
FIG. 1 is a flowchart of a method of encrypting a target media file based on one or more biometric characteristics of an addressee, according to some embodiments of the present invention.
Figure 2:
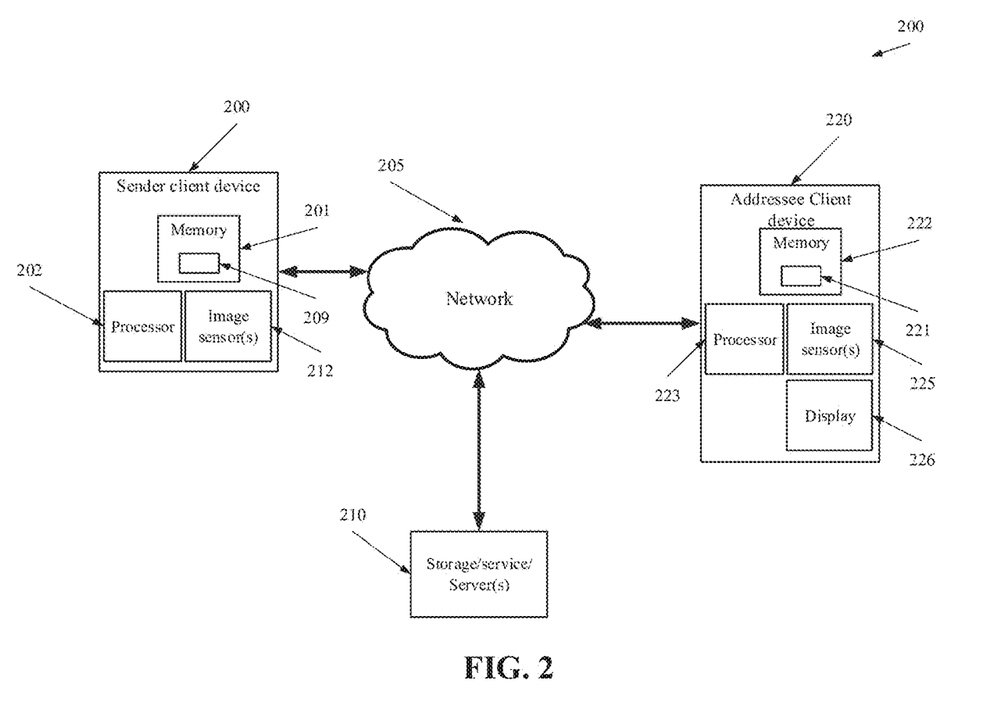
FIG. 2 is a schematic illustration of a network and network connected devices, according to some embodiments of the present invention.

Reference is now made to FIG. 1, which is a flowchart 100 of a method of encrypting a target media file, such as an image, a frame, a text message and/or a video based on one or more biometric characteristics of an addressee, for instance biometric characteristics extracted from one or more images, according to some embodiments of the present invention. Reference is also made to FIG. 2 which is a schematic illustration of a network 205 and a sender network connected device 200 and an addressee network connected device 220, optionally client devices such as mobile devices, for example smartphones, tablets, and/or wearable devices for instance Smartwatches, according to some embodiments of the present invention. Client device 200 having a memory 201 hosting a code 209 such as an application code and one or more processor(s) 202 that executes the code for implementing a method for encrypting media images such as method 100.

The code may be of an application for transmitting encrypted target media files and/or an application for communication between users such as an instant messaging application and/or the like, for instance an application store application of a script of an instant messaging (IM) application. Optionally, the application is a chat application and/or an add-to to a chat application and on that allows both encrypting and decrypting media files as described herein. The application may interface with existing IM application or be integrated in an IM application as known in the art. The application code may be downloaded using a browser executed on by the processor 202, a standalone application and/or an add-on to another application such as an instant messaging application. Alternatively, the application is downloaded from an application store and installed as known in the art. While the description herein related to a local execution of the code on the processor 202, some or all of the features of the code may be executed remotely on one or more servers, for instance by virtual machine executed remotely.

First, as shown at 101, a target media file is designated by a human sender, for instance selected, shared and/or added as an attachment or an uploaded media file to a session managed by a messaging service. Optionally, the target media file is selected based on a user input of the sender to a graphical user interface (GUI) presented on a display 203 of the device 100, for instance a window facilitating a user to designate one or more media files such as an image, a graphics interchange format (GIF) file, or a video file from a gallery as a target media file. In another example, the GUI is of a camera functionality that allows the user to use an image sensor 204 and optionally a microphone 205 of the device 200, for instance one or more cameras, to capture a target media file for encryption.

Optionally, the target media file is designated by an execution of a chat application on the processor 202. In such embodiments, the target media file is designated to be encrypted and forwarded in a message that will be sent as an instant message during a chat session such as a social network session or an IM session comprising a plurality of textual messages which are exchanged between the sender and one or more addressees, for brevity referred to herein as an addressee.

Optionally, the designation of a target media file is an outcome of automatically classifying the target media file as containing private content, such as nudity. This can be done using existing and known nudity detection algorithms.

As shown at 102, a user selection indicative of one or more addressee(s) is received, for example selected based on a user input to the GUI presented on the display 203. For brevity, addressees are referred to herein as an addressee. Optionally, the GUI allows a user to select a contact from a contact record database of the device, for instance the contacts of a mobile device. Optionally, the GUI allows a user to select a contact from a contact record of a subscriber of an instance messaging application or a social network. This can be done using a suitable Application Program Interface (API). The contact selection may be performed before the media file is designated. Optionally, the GUI presents only face, allows the user to select an addressee without knowing or specifying his name.

Now, as shown at 103, one or more media files imaging the addressee (or each addressee) are identified, for instance images or video files automatically extracted from the contact record of the addressee, from her social network profile, and/or from the gallery of the user, for instance by matching identifiers of the addressee (e.g. name, phone number, email, and/or social network name) with image metadata such as tags.

Additionally or alternatively, the user is requested to upload one or more images of the addressee, for instance facial images. In one example, an identifier of a selected addressee is used as a query input for automatically searching for the social profile of a user and media files depicting the user are extracted from the social profile. In another example, an identifier of a selected addressee is used as a query input for automatically searching for biometric features of a subscriber of a service where the biometric features have been already extracted from images or video files in the past. Optionally biometric features of an addresses are provided by the addressee or by the system upon approval of the addressee. In such embodiments, a file consisting the biometric features may be provided by system, for instance from a subscriber biometric features database or in response to a request sent from the client device of the sender. Biometric features may be acquired in a Biometric features acquisition process that is executed by a GUI instructing the user how to image himself to achieve a good reference image from which biometric features can be efficiently acquired.

As shown at 104, one or more biometric features of the addressee(s) are extracted from the one or more media files associated with the addressee. For example biometric features such as facial features for example nose shape, eye color, skin texture and/or color, size and shape of eyes, facial symmetry, and/or the like are extracted from one or more facial images using facial recognition analysis. Other biometric features may include facial expressions, pupil signature, and/or behavioral pattern. The biometric features may be stored in a vector and may also include calculated parameters such as size ratio and/or distances between biometric features. Optionally, extracted biometric features are stored for future usages allowing avoiding the need for 104 in a future encryption of target media files. Optionally, biometric features are extracted in a preprocessing stage, for instance before any target media file is designated for encryption.

Now, as shown at 105, the biometric feature(s) which are extracted from media files(s) associated with the addressee are used to encrypt the target media file. When a number of addressees are selected, the biometric feature(s) which are extracted from image(s) associated with each addressee are used to encrypt a different copy of the target media file. The biometric feature(s) may be used as unique values or weight in an encryption function used to encrypt the target media file. The encryption function has an inverse function to decrypt the encrypted target media file to get the target media file when the biometric feature(s) is known.

For example, the target media file is encrypted with a password protection using 1D Secure Hash Algorithm (SHA)-2 or Advanced Encryption Standard (AES) algorithm coupled with a Fourier transform where the password is set based on the biometric feature(s) and/or normalized values calculated from the values of the biometric feature(s). For example, see for example Nandu Krishnan J, Roshny G. Kumar, "*Security Enhanced Image Encryption using Password based AES Algorithm*", International Journal of Engineering Research and Technology (IJERT), ISSN: 2278-0181, Volume. 4, Issue. 06, June—2015, e-ISSN: 2278-0181 which is incorporated herein by reference.

Optionally, the target media file is deleted after the encrypted target media file created. In such embodiments, no unencrypted copy of the encrypted media is stored or made available. Additionally or alternatively, the encrypted target media file is stored in a remote service or storage optionally executed on one or more servers(s) such as 210. The encrypted target media file will be available over a network, for instance to application 221 (e.g. a copy of 209) which is installed in a memory 222 of the mobile device 220 of the addressee and executed by processor 223. In such an embodiment, a link or a unique identifier is forwarded to the application 221 associated with the addressee to allow the application 221 to access the encrypted target media file.

Additionally or alternatively, the encryption is done so as to allow decrypting the target media file based on biometric features of a number of users, for example the addressee and the sender. In such a manner, the sender may also have access to the target media file.

Now, as shown at 106, access information for facilitating a decryption and a presentation of the encrypted target media file based on the biometric features is forwarded to the device 220 associated with the addressee, for instance to the application 221. The access information maybe file metadata, file field and/or a reference such as URI for directing an application to access a copy of the encrypted target media file in the remote server 210. The forwarding is done for instance as an attachment to an email, as an instant message and/or as a message sent to an application executed on a device associated with the addressee. The forwarding is optionally done over the network 205, for instance over the internet. Optionally, the access is facilitated only after the client device 220 is authenticated, for instance based on matching between an addressee identifier provided by the sender (e.g. a phone number or an email number) and the mobile device or an application hosted thereon. The authentication may be also based on the recognition of biometric features, such as the biometric features used in the encryption process, for instance similarly to the described below.

After the encrypted target media file or the access information is forwarded to the device 220 associated with the addressee, for instance to an application installed on a mobile device of the addressee, the encrypted target media file may be decrypted based on the biometric feature(s) of the addressee which are captured using one or more sensors of the addressee for instance image sensors 225 of the device 220.

Figure 3:
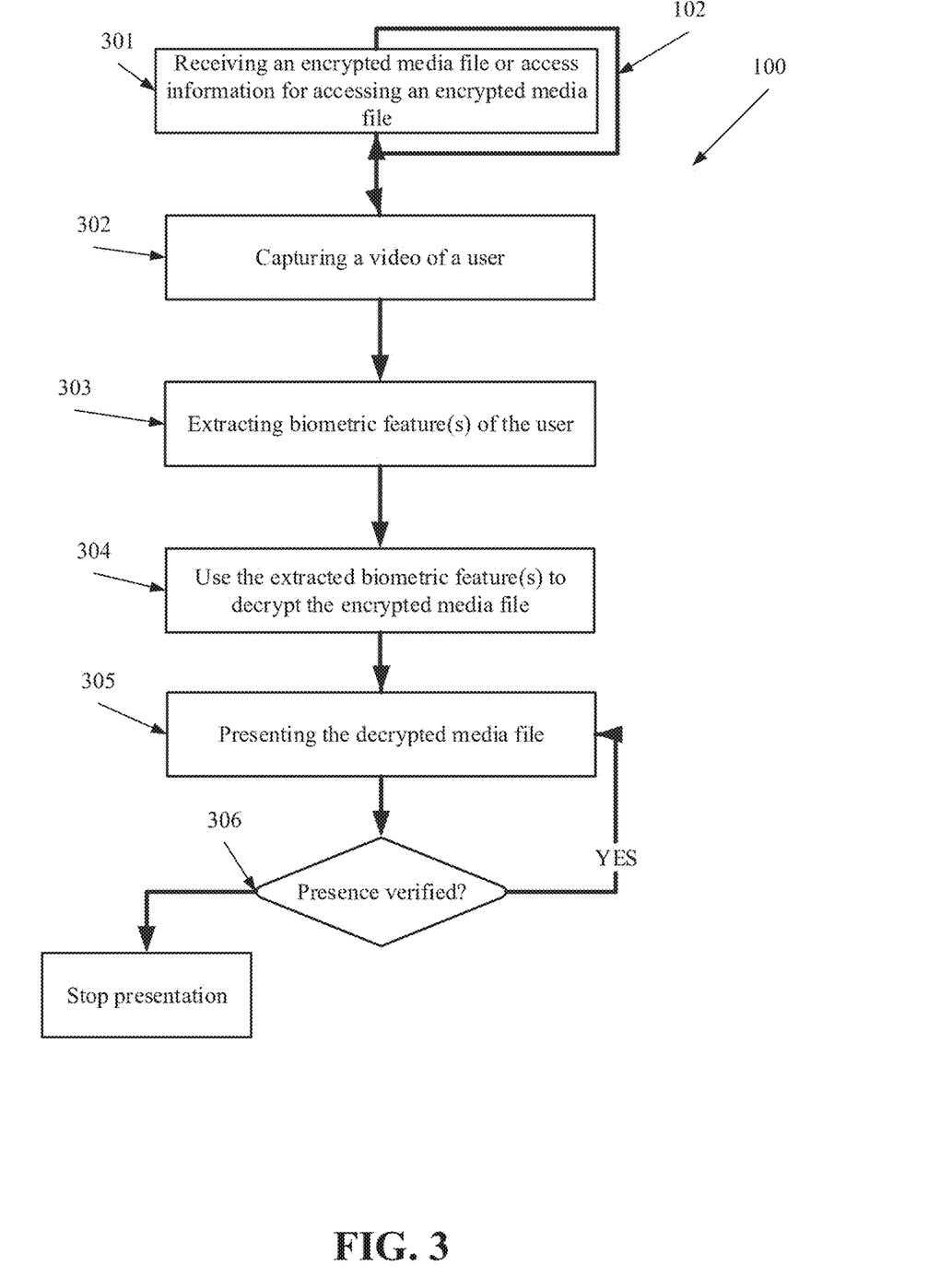
FIG. 3 is a flowchart of a method for decrypting a target media file using biometric feature(s), for instance as long as a live video documenting the biometric feature(s) and optionally vitality signs of a person having the biometric feature(s) is captured, according to some embodiments of the present invention.

For example, reference is now also made to FIG. 3 which is a flowchart of a method for decrypting a target media file using biometric feature(s), for instance as long as a live video documenting the biometric feature(s) and optionally vitality signs of a person having the biometric feature(s) is captured, according to some embodiments of the present invention.

First, as shown at 301, a message addressed to a user and comprising access information linking or facilitating access to an encrypted target media file is received by an application. For instance, the above described encrypted target media file is received over the network 205 at application 221 which is executed on the mobile device 220. Optionally, the user is the above described addressee. The access information maybe a file name or field for accessing a file stored in the received message or a link to a copy of the encrypted target media file at a remote server or service. The encrypted target media file may also be stored in server 210 and acquired from or accessed when indicated by the user, for instance in response to a selection of a notification and/or a link and/or an icon presented in an application such as a chat application.

Now, as shown at 302, a video imaging a user of the client device 220 is captured, for instance a video imaging a face of a user such as a video stream captured using a frontal camera of a smartphone such as image sensor(s) 225. Optionally, the video is captured when the encrypted target media file is received or accessed.

As shown at 303, this allows automatically extracting biometric feature(s) from the video that images the user. The biometric feature(s) may be extracted using image processing techniques, for instance facial recognition algorithms.

This allows, as shown at 304, to use the biometric feature(s) to decrypt the encrypted target media file, creating a decrypted target media file which is ready for presentation, optionally temporary.

As shown at 305, the decrypted target media file may now be presented to the user for example by a player of the application 221 executed on the mobile device 220. The encrypted target media file may be a locally stored copy or a remote copy accessed using the access information as described above. Optionally, the used player places hurdles on tries to capture the displayed decrypted media file, for instance by iteratively rendering the media file with a variable relatively low display rate and/or by non-simultaneous presentation of different regions of the decrypted media file, for instance sequential presentation of different image regions. Additionally or alternatively presentation is shot off when an image capture trial is detected by a designated code of the application, for instance an image capture thread or process and/or a press on a selected button such as the volume button or the on off button.

Additionally or alternatively, as shown at 306, the presentation is conditional, for instance lasts only as long as presence of the user is verified, for example as long as biometric features are detected continuously or iteratively in a live video stream capturing images of the user, for instance a facial video. Optionally, when biometric features of a person which is not the addressee or the sender appears in the live video, the presentation immediately stopped or obscured, for instance by blurring effect(s), optionally even when the biometric features of the addressee are detected.

Optionally, the presentation lasts only as long as a touch is detected, for example on a touch screen and/or on a fingerprint detection button. Optionally, presentation last only as long as another biometric feature of the user is detected, for instance a fingerprint.

Figure 4:
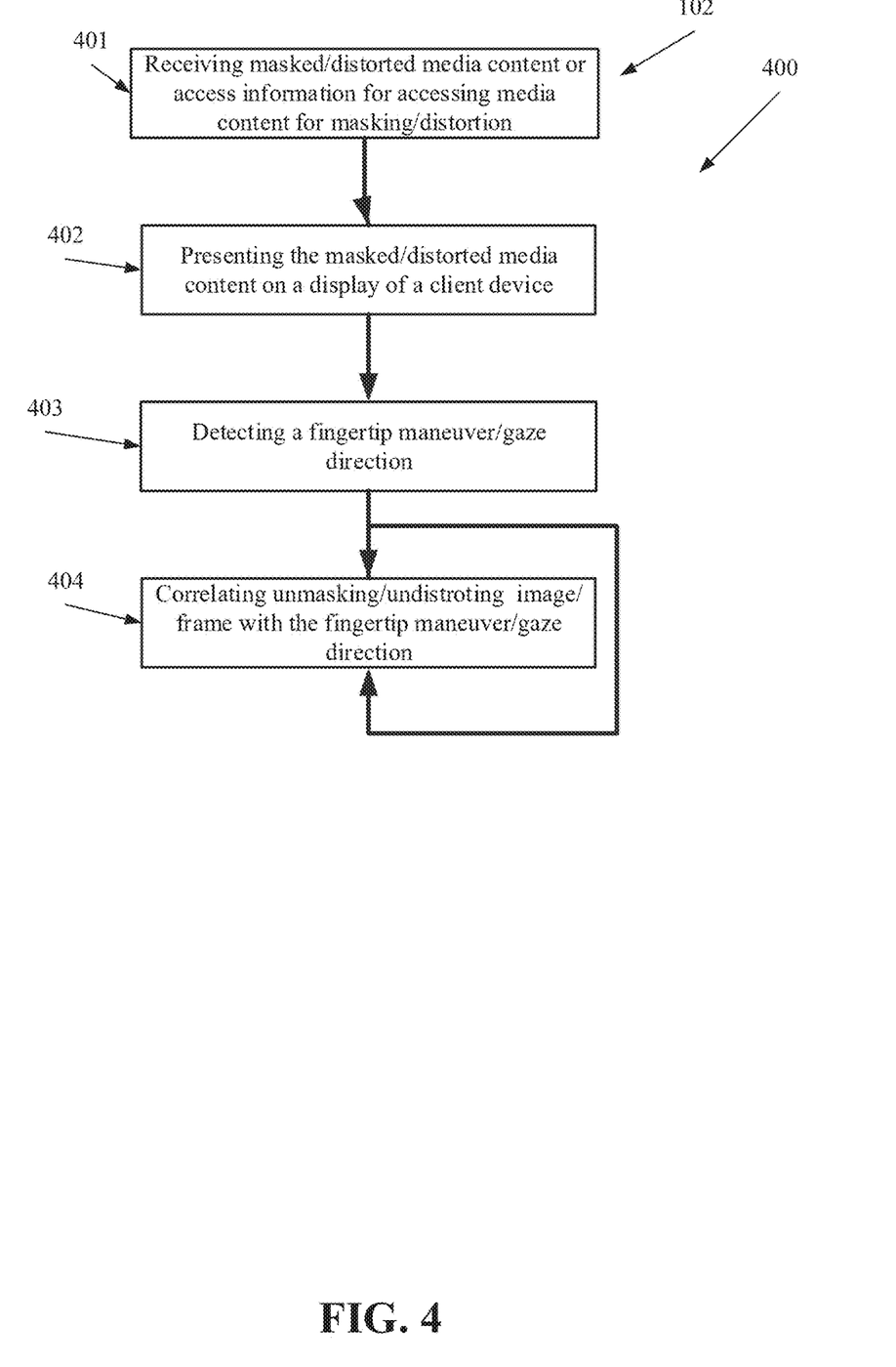
FIG. 4 is a schematic illustration to a method of partly revealing a masked image or a masked frame presented on a display of a client device so as to prevent capturing of a full version of the image or the frame by capturing the pixels presented on a screen in a given moment, according to some embodiments of present application.

Reference is also made to FIG. 4 which is a schematic illustration to a method 400 of partly revealing a masked media content such as a masked image or one or more masked frames of a video presented on a display of a client device so as to prevent from an addressee or a receiving client device user or application to capture a full version of the image or the frame by capturing the pixels presented on a screen in a given moment, according to some embodiments of present application. The masked media content may also be or contain textual content. For brevity, a masked image and one or more masked frames of a video are referred to herein interchangeably.

The method may be implemented by an addressee client device having a processor for executing a code for implementing the method 400, for instance the addressee client device 220. The masked media content may include an image or one or more frames which have been generated by distorting a target media file and/or or by adding a distortion layer thereto or to a player designed to present the image or one or more frames as masked media content. Images or frames described herein may be masked and/or distorted so the terms masking and distorting are referred to herein interchangeably. Additionally or alternatively, the method may be implemented by a client device having a processor and participating in a video chat for executing a code for implementing the method 400, for instance the addressee client device 220. The masked media content may be based on a target media file or record such as an image or one or more frames (e.g. a video stream or file) which have been generated or captured by another device (e.g. a mobile device with a camera) and distorted and/or processed or by adding a distortion layer thereto. The masked media content may additionally or alternatively presented by a player designed to present image(s) or frame(s) as masked media content. Images or frames described herein may be masked and/or distorted so the terms masking and distorting are referred to herein interchangeably.

First, as shown at 401, access information for accessing masked media content or a media file storing media content designated to be distorted is received at an addressee client device, for instance in a message. Additionally or alternatively, the masked media content is a video stream received as part of a video chat established between different participants who use different client devices, for example as described below. The masked media content or designated media file storing media content are optionally selected by a sender using a sender client device such as 200 or captured using a device that executes a chat video application. The masked media content may be any image(s) or frame(s) encrypted or otherwise processed in a manner that a presentation thereof without applying a regional unmasking effect would be a presentation of a distorted version of the image or frame. The masked media content is optionally an outcome of applying a distortion function or a masking function on an image or one or more frames of a video. The applying may be performed locally by the addressee client device 220, for instance by a player of an executed application, remotely by the sender client device 200 or in a server. Distortion may be a blur effect, a Gaussian noise effect, a salt and pepper effect, wavy lines effect, dark or light spots effect, misalignment effect and/or any other distortion effect. The distortion is made to a level that assures inability to identify the identity of a depicted person in the image. As used herein an addressee client device and a sender client device may be client devices executing video chat applications and sending masked media content to each other simultaneously.

When sent, the access information may be a link or an encrypted media file sent by client device 200 to client device 220 as described above or a link to a media file storing media content designated to be distorted. The access information may be data for locating a masked media content which is part of a message for local access by the client device 220, for instance temporarily and/or access information to access a file stored remotely at the server 210, for instance as described above. Optionally, the original media file is deleted after the masked media content is generated.

Optionally the reception of the access information is an outcome of automatically classifying an image or a frame as containing private content, such as nudity. This can be done using existing and known nudity detection algorithms.

Now, as shown at 402, the masked media content is presented on a display of the addressee client device, for instance on a screen display 226, such as a touch screen display of the receiving client device 220. The display may be held by a designated player, optionally as part of a graphical user interface of the application 221. As indicated above the player may execute a distortion function and/or present an already distorted or masked media file.

As shown at 403, while the masked media content is presented on the display 226, a fingertip performing a fingertip maneuver, optionally a finger tap, or a fingertip gesture along a nonlinear line in front of the display is detected, for instance by application 221. The fingertip maneuver may be detected by analyzing outputs of the touch screen display 226. Additionally or alternatively, while the masked media content is presented on the display 226, a gaze direction of a user is detected, for instance by application 221. The gaze direction may be detected by analyzing outputs of the image sensor(s) 225.

The fingertip and/or the gaze may be detected in one device for controlling parameters of the unmasked area (e.g. region) presented in the same device, for example as described in FIGS. 5A-5C and the description below exemplify the process in a video chat or another device, for example as described in FIGS. 6A-6D and the description below exemplify the process in a video chat.

As shown at 404, the detection of the fingertip maneuver and/or gaze direction allows the application, such as 221, to spatiotemporally correlate between the unmasking of a plurality of regions of the masked media content and spatiotemporal data of a fingertip performing a fingertip maneuver along a nonlinear line in front of the display 226 or a gaze of a user staring at different regions of the masked media content. The correlation assures that a region selected by a location of a fingertip or a direction of a gaze is unmasked while other regions of the masked media content remain masked. Optionally, one or more of the regions will not be unmasked even when they are selected by the fingertip or the gaze. These regions may be selected by the sender or automatically during the generation of the masked media content. For example, the face of a user in an image is identified and remains masked at all time. Alternatively, private organs are identified and remain masked at all time. FIGS. 6A-6D and the description below exemplify the process in a video chat.

Optionally, unmasking occurs after a successful authentication of the addressee client device based on an addressee identifier provided by the sender client device.

The unmasking may be performed by applying a distortion removal coefficient or function such as a de-blurring coefficient or by a script for acquiring respective pixels from a remote secured storage such as 210. The distortion removal coefficient or function may be based on a decryption key, for instance based on a password and/or biometric features as described above. The de-blurring coefficient may be received from the sender client device or from a central server such as 210.

Optionally, the regions are image regions located in proximity to the maneuvered fingertip, for instance above, below and/or to the side of the maneuvered fingertip while the maneuvered fingertip is in front of the display, for instance touch a touch screen. Each one of the regions is unmasked while other of regions remains distorted. Additionally or alternatively, the regions are image regions located in proximity to an estimated center of gaze direction, for instance above, below and/or to the side of the estimated center of gaze direction, for instance while the user looks at the screen. As indicated above, each one of the regions is unmasked while other of regions remains distorted.

Figure 5A:
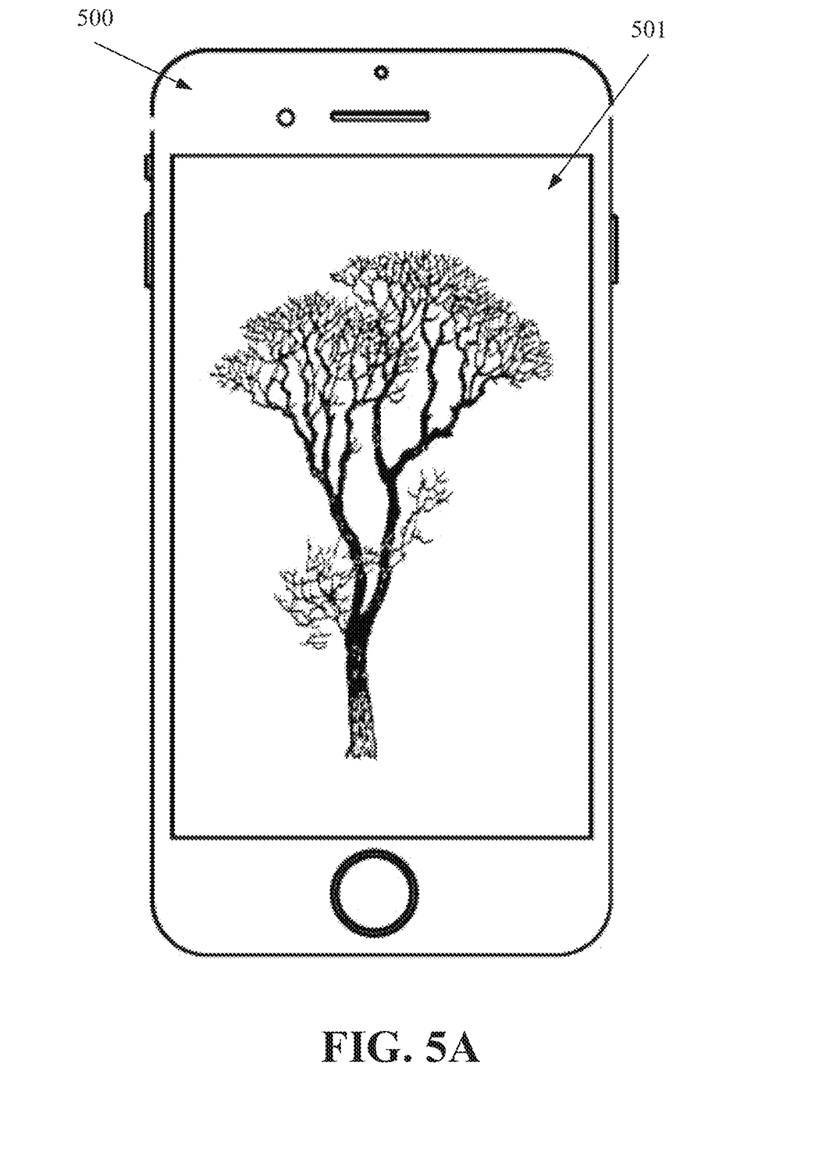
FIGS. 5A, 5B and 5C are, respectively, an image depicting a display of a smartphone that presents an origin media file and images depicting this display presenting a masked version of the origin media file with unmasked regions correlated with locations of a fingertip in two different time frames during a fingertip manipulation according to some embodiments of the present invention.
Figure 5B:
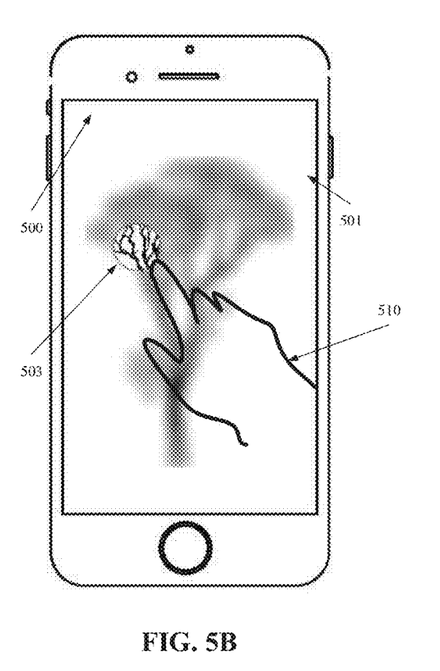
Figure 5C:
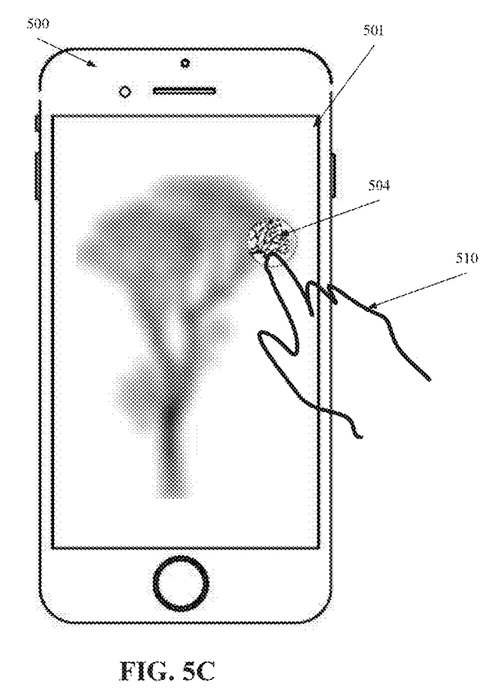

For example, FIG. 5A depicts a display of a client device 500, a smartphone, that presents an origin media file. FIG. 5B depicts a touch screen 501 of the client device 500 that displays a masked media content 502 created by distorting the origin media file by applying a blurring coefficient and an unmasked region 503 correlated with a location of fingertip. FIG. 5C depicts the client device displaying the masked media content and another unmasked region 504 correlated with another location of fingertip 510, for instance at a later time, optionally during the same gesture which is held in front of the screen. Optionally, the unmasked area is an elliptical region, for example circular, having a radius between 0.5 centimeter and 2.5 cm. Optionally, the unmasked area is a polygonal area such as a cube having an edge of between 0.5 centimeter and 2.5 centimeter.

Optionally, the size of an unmasked region is calculated based on characteristic(s) calculated by processing the origin media file which was distorted for creating the masked media content. In such a manner, an image captured by capturing a screen presenting the masked media content together with a single unmasked region does not depict both intimate organs and a face of a person. The characteristic(s) may be a facial area of a person imaged in an origin image or frame, a presence or an absence of a certain anatomical organ imaged in an origin image or frame, a presence or an absence of a certain person in an origin image or frame, a presence or an absence of a child in an origin image or frame and/or the like.

Reference is now also made to FIGS. 6A-6D which are images depicting a control of ratio and location between masked area and unmasked areas of an image during a video chat by user inputs, according to some embodiments of the present invention. Each one of FIGS. 6A-6D depicts an example video chat window of GUI. The video chat window presents to a certain participant a video stream imaging another participant in a blurred version on a top sub window 601 and a video stream imaging the participant in a masked version on a lower sub window 602. The video stream imaging the participant is captured using the imager of the client presenting the video chat window.

Figure 6A:
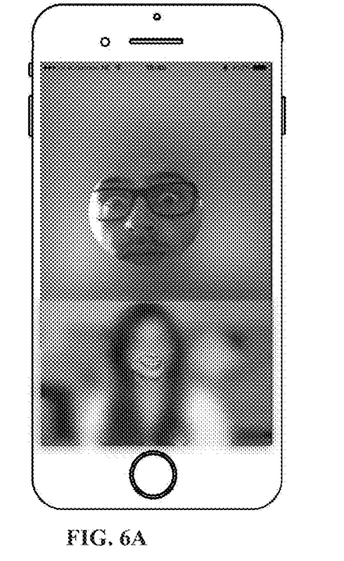
FIGS. 6A, 6B, 6C and 6D are images depicting user control of the ratio and location between masked area and unmasked areas of an image during a video chat according to some embodiments of the present invention.
Figure 6B:
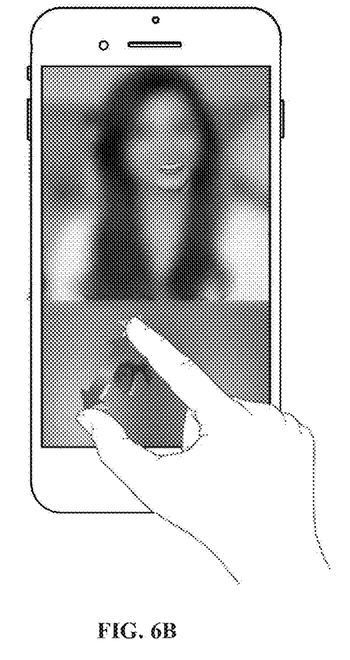
Figures 6C, 6D:
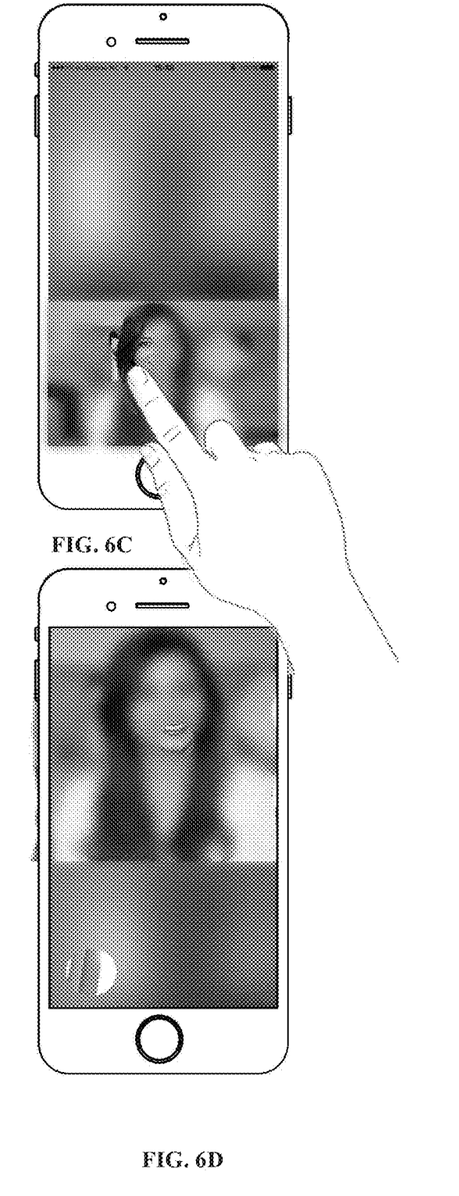

As outlined above, a presentation of a video chat between participants may be masked, for example blurred. Optionally, one or more parameters of an unmasked area presented to one participant are controlled by another participant of the video chat, for example the location and/or size and/or shape of the unmasked area. For example, FIG. 6B depicts a fingertip gesture performed by a first participant of a video chat for controlling a size of a first unmasked area and FIG. 6A depicts the change to the first unmasked area presented to a second participant of this video chat. In another example FIG. 6C depicts a fingertip gesture performed by the second participant of the video chat for controlling the location of a second unmasked area and FIG. 6D depicts the change to the location of the second unmasked area which is presented to the first participant of this video chat.

In the above embodiments, participants may decide which area of the screen to expose and for how long by finger or gaze actions as described above.

Optionally, the client device (e.g. a mobile phone, a smartphone, a tablet, a laptop or a desktop, for example 200 and 220 as defined above) that facilitates a display of the window depicted in FIGS. 6A-6D comprises a display (e.g. a screen), a program store (e.g. memory) storing a code (e.g. application) and processor(s) coupled to the program store for executing the stored code. The code is optionally a video chat application executing a code facilitating a video chat. The code includes instructions for presenting on the display masked version of media content (e.g. a video stream) designated or captured by a remote client device, processing the masked version to reveal a region of the media content in the masked version while other regions of said masked version remain masked, and controlling at least one of a location of the revealed region and a size of the revealed region in relation to the size of the unmasked area according to fingertip gesture or gaze movement recorded by the remote client device. Optionally, the position of the region is continuously adjusted according to a current location of a face (or any other predefined organs), for instance by employing face detection methodologies.

This client device optionally also includes a camera (e.g. a frontal camera) adapted to capture media content such as another media content (captured video stream) captured by the remote client and a code (e.g. the same application) which is executed by the processor thereof for: presenting on the display a masked version of the captured video stream, recording fingertip gesture or gaze movement while the masked version is presented on the display, sending the masked version or the captured media content to the remote client device, generating, according to the fingertip gesture or gaze movement, instructions to change parameter(s) of a region revealing a portion of the captured video stream in the masked version while other portions of said masked version remain masked, and sending the instructions to the remote client device so as to allow the remote client device to change the parameter(s) of the region while at least some of the masked version is presented on the display.

Optionally, the masked media content is stored in a server and accessed using access information received via a network, for example in a message as described above. In such embodiments, unmasking may be performed locally by a player installed in the addressee client device, for instance by applying a decryption key. The decryption key may be calculated using biometric features as described above or based on an identifier of an addressee added to the message with the access information.

Optionally, media content designated to be distorted is accessed by the player, for instance after an authentication of the accessing device. The accessed designated media content is distorted by the player and regions thereof are undistorted by the player as described above. In such embodiments the player may be designed to avoid storing a full copy of the accessed designated media content. Alternatively, the player may sequentially access the media content designated to be distorted for acquiring unmasked regions selected according to fingertip location and/or gaze direction. In such embodiment no masking or unmasking functions may be executed and region data may be sequentially acquired and deleted after presentation.

According to some embodiments of the present invention regions of an image are unmasked or undistorted in a sequential pattern, optionally random, so as to prevent from a user to capture a single image presenting all the content media. In such embodiments the unmasking is not correlated with a user gazing direction and/or fingertip location.

According to some embodiments of the present invention, a client device which adjust a location of a masked region in a display of a masked version of content captured by a remote client device includes a display for presenting the masked version, a program store storing a code of an application, for example as described above, and a processor coupled to the program store for executing the stored code. This allows the processor to execute the conde for presenting on the display the masked version of media content designated or captured by the remote client device, processing the masked version to reveal a region of the media content in the masked version while other regions of the masked version remain masked, and controlling at least one of a location of the revealed region and a size of the revealed region in relation to the size of the unmasked area according to fingertip gesture or gaze movement recorded by the remote client device. The client device may any of the above described client devices and the media may be any of the above described media (e.g. chat video content).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and device will be developed and the scope of the term a processor, a code, a gaze direction and a fingertip manipulation is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A client device of partly revealing at least one image depicting a person, comprising:
    a display;
    a program store storing a code; and
    a processor coupled to the program store for executing the stored code, the code comprising instructions for:
        presenting on the display masked version of the at east one and designated or captured by a remote client device,
        processing the masked version to reveal a region of the at least one image in the masked version while other regions of the at least one image remain masked, and
        while at least some of the masked version is presented on a display of the remote client device:
            detecting at least one of: a fingertip maneuvered along a nonlinear line in front of the display and a gaze direction changed along the nonlinear line in front of the display, and
            presenting different regions of the at least one image in sequential fashion by controlling a location of the revealed region to be correlated with at least one of the fingertip maneuvered along the nonlinear line and gaze direction changed along the nonlinear line.

2. The client device of claim 1, wherein the client device is a smartphone or a tablet.

3. A client device of partly revealing at least one image depicting a person, comprising:
    a display;
    a camera adapted to capture the at least one image;
    a program store storing a code; and
    a processor coupled to the program store for executing the stored code, the code comprising instructions for:
        presenting on the display a masked version of the at least one image,
        sending the masked version or the at least one image to a remote client device;
        while the masked version is presented by the remote client device:
            detecting at least one of: a fingertip maneuvered along a nonlinear line in front of the display and a gaze direction changed along the nonlinear line in front of the display, and
            generating, according to the fingertip maneuver or gaze direction change, instructions to change the location of a region revealing a portion of the at least one image in the masked version in correlation with at least one of the fingertip maneuvered along the nonlinear line and gaze direction changed along the nonlinear line while other portions of the masked version remain masked, and
        sending the instructions to a remote client device so as to allow the remote client device to present different regions of the at least one image in sequential fashion by changing the location of the region in correlation with at least one of the fingertip maneuvered along the nonlinear line and gaze direction changed along the nonlinear line while at least some of the masked version is presented on the display.

4. The device of claim 3, wherein the client device is a smartphone or a tablet and the at least one image is a video stream and the camera is a frontal camera of the smartphone or the tablet.

5. A method of partly revealing at least one image depicting a person, comprising:
    presenting on a display of a first client device a masked version of the at least one image and designated or captured by a second client device;
    processing the masked version to reveal a region of the at least one image in an unmasked area while other regions of the masked version remain masked; and
    while at least some of the masked version is presented by the first client device:
        detecting at least one of: a fingertip maneuvered along a nonlinear line in front of the display and a gaze direction changed along the nonlinear line in front of the display, and controlling a location of the n in the masked area in correlation with at least one of the fingertip maneuvered along the nonlinear line and gaze direction changed along the nonlinear line for presenting different regions of the at least one image in sequential fashion.

6. The method of claim 5, wherein the location of the region is continuously adjusted according to a location of a face detected by an analysis of the at least one image.

7. The method of claim 5, wherein the at least one image is video stream captured by the second client device during a video chat session that is established between the first client device and the second client device.

8. The method of claim 5, wherein the at least one image is an image or a video and the masked version is a blurred version of the image or the video.

9. The method of claim 5, wherein the presenting and the unmasking are performed locally by a player installed in the first client device.

10. The method of claim 9, wherein the masked version is generated locally by a player installed in the first client device.

11. The method of claim 5, wherein the unmasking occurs after a successful authentication of the first client device based on an identifier provided by the second client device.

12. The method of claim 5, wherein the masked version is an outcome of applying a distortion effect on an unmasked version of at least one image; wherein the unmasked version is designated using the second client device.

13. The method of claim 12, wherein the masked version created during a chat video session held using the first and second devices.

14. The method of claim 1, wherein a size of the region is calculated according to at least one characteristic of the person imaged in the at least one image.

15. The method of claim 14, wherein the at least one characteristic is a member of a group consisting of: a facial area of a person imaged in the image, a presence or an absence of a certain anatomical organ imaged in the image, a presence or an absence of a certain person in the image.

16. The method of claim 9, wherein the unmasking is performed by applying a de-blurring coefficient received from the second client device.

17. The method of claim 14, wherein the characteristic of content is selected from a group consisting of: a facial area of the person imaged in the at least one image, a presence or an absence of a certain anatomical organ imaged in the at least one image, a presence or an absence of a certain person in the at least one image, a presence or an absence of a child in the at least one image.

* * * * *